United States Patent [19]

Backhouse

[11] 4,209,435
[45] Jun. 24, 1980

[54] DISPERSION PREPARATION

[76] Inventor: Alan J. Backhouse, Monks Wood, Monks Close, St. Mary's Hill, South Ascot, Berkshire, England

[21] Appl. No.: 947,405

[22] Filed: Oct. 2, 1978

[30] Foreign Application Priority Data

Oct. 12, 1977 [GB] United Kingdom ............... 42457/77

[51] Int. Cl.$^2$ ............................................... C08A 33/10
[52] U.S. Cl. .................. 260/29.6 RW; 260/29.6 PM; 260/34.2
[58] Field of Search .............. 260/29.6 PM, 29.6 RW, 260/29.6 WB, 34.2

[56] References Cited

U.S. PATENT DOCUMENTS

| 3,691,123 | 9/1972 | Clarke | 260/34.2 |
| 3,935,155 | 1/1976 | Osmond | 260/34.2 |
| 3,979,349 | 9/1976 | Fink | 260/29.6 RW |

FOREIGN PATENT DOCUMENTS

| 941305 | 11/1963 | United Kingdom . |
| 1052241 | 12/1966 | United Kingdom . |
| 1095288 | 12/1967 | United Kingdom . |
| 1122397 | 8/1968 | United Kingdom . |
| 1123611 | 8/1968 | United Kingdom . |
| 1143404 | 2/1969 | United Kingdom . |

Primary Examiner—Paul R. Michl

[57] ABSTRACT

A method of preparing a stable dispersion in an aqueous medium of particles of polymer in which stabilisation of the particles against flocculation is effected by a steric mechanism. The method comprises (i) forming a sterically stabilized dispersion in a non-aqueous liquid of a first polymer insoluble in the non-aqueous liquid and in water; (ii) polymerizing monomer in the same non-aqueous liquid in the presence of the particles of the first polymer and of a steric stabilizer, so as to form a second polymer which is soluble in the chosen aqueous medium; (iii) transferring the resulting particles to the aqueous medium. There may be prepared in this way aqueous dispersions of polymers incorporating units of water-soluble monomers, which are diffiult to make by known aqueous emulsion polymerization techniques.

11 Claims, No Drawings

DISPERSION PREPARATION

This invention relates to the preparation of dispersions of polymer particles in aqueous media, in which the particles are stabilised against flocculation.

It is well known to prepare such dispersions by the conventional, so-called emulsion polymerisation techniques in which a monomer is emulsified in water with the aid of a low molecular weight, ionic or non-ionic, water-soluble surfactant and is polymerised in that state under the influence of a water-soluble initiator which is usually ionic in nature. As a result of these procedures, the particles of polymer which constitute the disperse phase are at least in considerable measure stabilised against flocculation by virtue of their carrying on their surfaces electrically charged molecular species derived from the initiator and/or the surfactant. Whilst dispersions made in this way have become well established in commercial use, particularly as the basis of coating compositions, the emulsion polymerisation procedure does suffer from certain limitations. One of these is the difficulty of applying it to the polymerisation of water-soluble monomers, even when the latter are employed in admixture with major proportions of water-insoluble monomers. The incorporation of water-soluble monomers may be desirable for various reasons, for example with the object of obtaining polymer particles in dispersion which, although not soluble in the aqueous medium, are nevertheless substantially swollen by that medium.

Another drawback associated with aqueous emulsion polymerisation is the fact that the presence of the electrically charged species mainly responsible for the stabilisation of the resulting dispersion may limit the range of properties which can be attained in coating compositions based upon it; for example, it is often difficult to obtain films of high durability from such compositions.

It is therefore a matter of practical interest to be able to prepare aqueous polymer dispersions by a route which is equally applicable to water-insoluble and water-soluble monomers and which enables charge-stabilisation of the particles of the disperse phase to be supplanted either completely or substantially by a stabilisation mechanism not requiring the presence of electrically charged species.

According to the present invention there is provided a method of preparing a stable dispersion in an aqueous medium of particles of polymer, the method comprising the steps of:

(i) forming a stable dispersion of particles of a first polymer in a non-aqueous liquid in the presence of a steric stabiliser for the particles, the first polymer being insoluble both in the non-aqueous liquid and in water;

(ii) polymerising in the same non-aqueous liquid, in the presence of the particles of the first polymer and of a steric stabiliser, one or more monomers capable of giving rise to a second polymer which is soluble in the chosen aqueous medium;

(iii) transferring the resulting polymer particles from the non-aqueous medium to the said aqueous medium.

The first step of the process thus defined may be carried out by any of the procedures which are well known in the art for making sterically stabilised non-aqueous dispersions of polymers. Three such procedures may be distinguished: (a) the re-dispersion in the non-aqueous liquid, in the presence dissolved therein of the steric stabiliser, of previously formed particles of polymer of colloidal dimensions; (b) the precipitation of the polymer in the non-aqueous liquid, again in the presence of the steric stabiliser, from a solution of the polymer in a suitable solvent; (c) the polymerisation in the non-aqueous liquid, in the presence of the steric stabiliser, of one or more monomers which are soluble in that liquid but give rise to a polymer which is insoluble therein. Of these three procedures, the dispersion of polymerisation technique of (c) is to be preferred for convenience of operation. There are, moreover, two different ways in which procedure (c) can be carried out, the first involving the use of a steric stabiliser which is performed and the second involving the production of the stabiliser in situ simultaneously with the formation of the disperse polymer.

All the procedures outlined above are fully described in the patent and technical literature. Reference may be made to British Pat. Nos. 941,305; 1,052,241; 1,122,397; 1,123,611; 1,143,404; and to "Dispersion Polymerisation in Organic Media", ed. K. E. J. Barrett (John Wiley, 1975). One of the aspects dealt with in these descriptions is the choice of a suitable dispersion liquid, or continuous phase, such that the polymer which is to be the disperse phase is insoluble therein, and furthermore, in the case of procedure (c), such that the monomers from which the disperse polymer is derived are soluble in that liquid. The most commonly employed type of polymer, as described in the foregoing references, is an acrylic polymer derived principally from one or more lower alkyl esters of acrylic or methacrylic acids, such as methyl methacrylate, ethyl methacrylate, butyl methacrylate, ethyl acrylate, butyl acrylate and 2-ethylhexylacrylate. A convenient class of non-aqueous liquids in which such a polymer is insoluble consists of the aliphatic hydrocarbons, such as hexane and heptane and commercially available mixtures of higher homologues, optionally containing minor proportions of aromatic hydrocarbons. Such liquids are also good solvents for the monomers in question and have relatively low boiling points. They are, therefore, a first general choice as dispersion liquids for any of the procedures mentioned above.

In those cases where the monomers being polymerised in step (i) are capable of forming a crosslinked polymer, it does not necessarily follow that the whole of the first polymer so produced is crosslinked; since the crosslinking monomer will normally be present in a minor proportion of the total monomers, reaction statistics will result in some non-crosslinked polymer being produced. The mode of stabilisation of the particles of first polymer in the non-aqueous liquid is, however, the same whether a particle consists entirely of crosslinked polymer or partly of cross-linked polymer and partly of non-crosslinked polymer.

In addition to the requirement that the polymer of the dispersion formed in step (i) should be insoluble in the non-aqueous liquid, it is also necessary that this polymer should be insoluble in water. This further condition may be satisfied in either of two ways. Firstly, the chemical composition of the polymer may be such that it is inherently insoluble in water, which is the case with the polymers derived from the acrylic and methacrylic ester monomers mentioned above. Secondly and alternatively, the polymer may be one which is inherently soluble in water but is rendered insoluble by being crosslinked. For example, a copolymer of one of the ester monomers just referred to with a substantial proportion of a hydrophilic monomer, such as a monoester of acrylic acid or methacrylic acid with a polyglycol (e.g. polyethylene glycol), or vinyl pyrrolidone, may be actually soluble in water, but by also including a minor proportion of a polyfunctional monomer such as ethylene glycol dimethacrylate the copolymer may be caused to be lightly crosslinked and it will then be insoluble in water, as indeed in non-aqueous liquids also. However, such a polymer may well be quite substantially swollen by contact with water or a non-aqueous medium; nevertheless it will remain as a discrete particle, having a clear phase boundary between itself and the aqueous medium. Again, a water-soluble polymer may be prepared by copolymerising an acrylic or methacrylic ester monomer with a moderate proportion (e.g. about 15% by weight) of acrylic acid or methacrylic acid and treating this with an aqueous solution of a strong base at about pH 8. A corresponding crosslinked, and hence water-insoluble, polymer may be obtained by incorporating also a small proportion of an epoxide group-bearing monomer, such as glycidyl methacrylate, which will react during the copolymerisation with some of the carboxyl groups present. Alternatively, a wter-soluble polymer of the opposite ionic type may be made by using diethylaminoethyl methacrylate as comonomer, and then neutralising the basic groups so introduced by treatment with an aqueous solution of an acid. As will be discussed below, the preparation of dispersions in aqueous media of particles consisting predominantly of such water-insoluble but water-swellable polymers is particularly facilitated by the present invention.

Besides the esters of acrylic and methacrylic acids which have been discussed above, other polymers which may be employed in step (i) of the method include those derived from vinyl esters such as vinyl acetate, vinyl propionate and vinyl chloroacetate. Like the acrylic polymers, these are generally insoluble in aliphatic hydrocarbons or aliphatic/aromatic hydrocarbon mixtures and, in the absence of hydrophilic comonomers, they are also insoluble in water; the monomers are, however, soluble in the hydrocarbons mentioned. Polymers derived wholly from vinylaromatic monomers such as styrene or vinyltoluene are rather less suitable as the disperse phase material, since they tend to have an appreciable solubility in hydrocarbon liquids, but these monomers may be used as comonomers along with the acrylic esters or vinyl esters.

The nature of the steric stabiliser employed in step (i) is also very fully discussed in the publications mentioned above. Broadly, the stabiliser is a substance which contains in the molecule two functional components. One component is a polymer chain which is solvatable by the non-aqueous liquid in which the particles of the first polymer are to be dispersed, in the sense that, if that component were an independent polymer molecule, it would actually be soluble in the liquid. The other component is a grouping which is capable of becoming associated with the disperse phase polymer. As a result of this association, each polymer particle becomes surrounded by the solvated chains of the stabiliser which, being in an extended configuration, form a steric barrier around the particle whereby adjacent particles are prevented from flicculating or aggregating. A type of steric stabiliser which is of wide utility is that of a block or graft copolymer, in which one polymeric component is solvatable by the non-aqueous liquid as described above and another polymeric component performs the associating function by virtue of not being solvatable by that liquid. In the simplest case, this second component can be identical in chemical composition with the disperse polymer itself, and there then arises the possibility, referred to earlier, of making such a stabiliser in situ during dispersion polymerisation of monomer to form that polymer. This is done by carrying out that polymersation in the presence, dissolved in the non-aqueous liquid, of a "precursor" compound containing in the molecule a polymer chain solvatable by that liquid, from which the solvatable component of the stabiliser is to be derived, and one or more groups which can copolymerise with, or undergo grafting by, the monomers being polymerised. For example, where the dispersion to be made in step (i) consists essentially of poly(methyl methacrylate) dispersed in aliphatic hydrocarbon, a suitable precursor that is soluble in the hydrocarbon is poly(lauryl methacrylate). Generally, however, it is preferred to use a preformed steric stabiliser, since this gives a greater flexibility of choice of its composition and better control over the concentration of it which is present during a dispersion polymerisation process. In the instance just given, a suitable preformed stabiliser is a copolymer formed by reacting poly(12-hydroxy stearic acid) (which is soluble in aliphatic hydrocarbon) with glycidyl methacrylate to introduce terminal unsaturated groupings on to the chains, and then to copolymerise the product with methyl methacrylate, or with a mixture of methyl methacrylate and methacrylic acid if it is desired to accentuate the insolubility in the hydrocarbon of the acrylic backbone polymer thus formed.

Again, further details of these stabilisers and their preparation may be obtained by reference to the patent and literature sources stated earlier, and stabilisers appropriate for any given choice of disperse polymer and non-aqueous liquid may readily be selected by those skilled in the art.

As already stated, a dispersion polymerisation of monomer is the preferred procedure for forming the disperse particles in step (i), but the re-dispersion or precipitation techniques are practical alternatives where this is desired. In the re-dispersion procedure, the previously formed colloidal particles of polymer may have been formed by the milling or grinding of coarser particles, or by the aqueous emulsion polymerisation of monomer followed by evaporation of the aqueous phase. Polymer which is precipitated from solution in order to form the disperse particles may have been formed by bulk polymerisation of monomer followed by dissolution in a suitable solvent, or by solution polymerisation in that solvent; the polymer solution so obtained is then added to an excess of the non-aqueous liquid in which the dispersion is to be formed, the liquid already having dissolved therein a suitable stearic stabiliser.

The second step of the method of the invention is in effect also dispersion polymerisation of monomer as discussed above, with the differences that the dispersion liquid contains, in addition to the steric stabiliser, the disperse particles of the first polymer, and that the monomers now polymerised are such as to give a second polymer which is of a hydrophilic character so as to be capable of dissolving in the aqueous medium in which the final dispersion is to be formed, at an appropriate pH. Monomers which are suitable for use in this second step are the hydrophilic monomers which have been mentioned above in connection with the production in step (i) of a polymer which is inherently soluble in water but is rendered insoluble by crosslinking, bearing in mind, of course, that in the case of step (ii) the polymer is not crosslinked. Thus, one may employ a hydroxyalkyl ester of acrylic acid or methacrylic acid, a monoacrylic or monomethacrylic ester of a polyglycol such as polyethylene glycol, a monovinyl ether of such a polyglycol, or vinyl pyrrolidone, optionally in admixture with smaller proportions of non-hydrophilic monomers such as methyl methacrylate, butyl acrylate, vinyl acetate or styrene, as already mentioned. Alternatively, or additionally, the required solubility in the aqueous medium can be achieved by using as a major monomer constituent an acrylic ester containing basic groups, for example dimethylaminoethyl methacrylate or diethylaminoethyl methacrylate, these groups being subsequently converted to salt groups by reaction with a suitable acid, for example lactic acid, dissolved in the aqueous medium. Yet again, the second polymer may be derived from comonomers containing a substantial proportion of a polymerisable carboxylic acid, such as acrylic acid or methacrylic acid, and is then capable of dissolving in an aqueous medium containing a dissolved base, such as dimethylaminoethanol. In general, therefore, the second polymer may be non-ionic, anionic or cationic in character.

The second polymer must, as already emphasised, be soluble in the chosen aqueous medium in which the final dispersion is to be formed. It will normally follow from this that the second polymer will be insoluble or of low solubility in the non-aqueous liquid of step (i), since the latter will usually be of a non-polar nature. However, it is acceptable if the second polymer has a limited solubility in the non-aqueous liquid, so that during the formation of that polymer a minor proportion of it passes into solution in that liquid whilst a major proportion becomes associated with the polymer particles formed in step (i). Evidently, the second polymer should not be so soluble in the non-aqueous liquid that only a small proportion of it becomes associated with the particles. The manner in which the second polymer is associated with the particles is not known with certainty. The scope of the present invention is, therefore, not to be considered limited by any theory or explanation of the mechanism of association, but it may be suggested that association can come about as the consequence of one or more of the following processes; firstly, by some grafting of the monomers from which the second polymer is formed on to the first polymer, under the conditions of free radical-initiated polymerisation; secondly, through reaction of chemically reactive groups in the second polymer with complementary reactive groups in the first polymer; thirdly, by physical entanglement of the molecules of the second polymer with those of the first polymer.

The steric stabiliser employed in step (ii) of the process will normally be the same as that employed in step (i), and indeed this second step is most straightforwardly carried out simply by continuing the dispersion polymerisation process with the appropriate monomer or mixture of monomers immediately after completion of the polymerisation of the monomer or monomers of step (i).

When the polymerisation leading to the formation of the second polymer is complete, the resulting stable dispersion is then contacted with the chosen aqueous medium and the non-aqueous liquid removed to the degree necessary to yield a stable dispersion of particles in the aqueous medium. It may be possible for there to be no removal of the non-aqueous liquid at all, or part-removal, or complete removal. This transfer of the particles may be effected in various ways, e.g. (i) by adding the non-aqueous dispersion from step (ii) to the aqueous medium and heating the mixture to displace the non-aqueous liquid by distillation; (ii) by adding a suitable water-miscible co-solvent to the non-aqueous dispersion, distilling off the non-aqueous liquid and then adding the aqueous medium; or (iii) by adding water, optionally with a water-miscible co-solvent, to the non-aqueous dispersion and distilling off the non-aqueous liquid. The particular method of transfer used will depend upon the ease of handling the materials involved; for example, in some cases, method (ii) may result in the transient production of rather thick emulsions and method (i) is then to be preferred. As already indicated, the aqueous medium may consist of water alone, or it may consist of water in admixture with a water-miscible organic co-solvent such as methanol or ethylene glycol monobutyl ether; the aqueous medium may also contain a water-soluble acid or base for the purpose of neutralising basic or acidic groups present in the second polymer. The proportion present of such a neutralising agent may be chosen so as to bring the final aqueous dispersion to some predetermined pH value.

The stability against flocculation of the dispersions so obtained is principally attributable to the attachment to the particles, probably by one or more of the mechanisms suggested earlier, of chains of the second polymer which are solvated by the aqueous medium and so form a steric barrier around the particles. In cases where acidic or basic groups present in the second polymer are neutralised as described above, this steric stabilisation will be supplemented by some degree of charge stabilisation.

The polymer dispersions in aqueous media which are obtained according to the present invention may be employed as film-forming materials in their own right or as additives to other film-forming polymers in either dispersion or solution in an aqueous medium. As already mentioned, the dispersions of the invention may be cationic, anionic or non-ionic in character as desired, so that the stabilising function may accordingly involve, or not involve (as the case may be), electrically charged molecular species. The method of the invention has the advantage, however, that were stabilisation by electrical charges is involved, the use of strong and/or low molecular weight acids or bases, or their salts as the stabilising species, such as is commonly the case in aqueous emulsion polymerisation techniques, may be avoided. It is thereby possible to overcome some of the difficulties which arise from the use of these conventional materials, for example the deleterious effect of an alkyl-sulphate or alkylsulphonate upon the weathering properties of a film or upon the stability of a thermosetting paint composition containing a melamine-formaldehyde resin the curing of which is catalysed by acids.

A principal other advantage of the invention is that, as already indicated, the monomers which are polymerised to form the water-insoluble first polymer, of which the disperse particles chiefly consist, may include water-soluble monomers such as monoesters of acrylic acid or methacrylic acid with a polyglycol, or vinyl pyrrolidone, without incurring difficulties which are usually encountered when employing such monomers in an emulsion polymerisation procedure. Thus it is possible according to the invention to obtain aqueous dispersions which are valuable as additives to other water-based film-forming systems by reason of the fact that the polymer particles are swollen by the aqueous medium. This imparts rheological properties to the dispersions, such as high degree of thixotropy, which make them useful, for example, in the control of flow of aqueous paints to be applied by spray or by brush. The method of the invention enables the degree of swelling of the particles by the aqueous medium and the molecular weight of the second polymer formed in step (ii) to be controlled so as to secure the optimum effect in any given system.

The invention is illustrated but not limited by the following Examples, in which parts and percentages are by weight:

EXAMPLE 1

A. PREPARATION OF PARTICLES OF FIRST POLYMER

To a vessel fitted with stirrer, thermometer and reflux condenser are added:

| | |
|---|---|
| Aliphatic hydrocarbon, b.p. 170°–210° C. | 11.017 parts |
| Aliphatic hydrocarbon, b.p. 90°–100° C. | 45.323 parts |

The mixture is heated to reflux temperature and the following mixture of ingredients is then added:

| | |
|---|---|
| Methyl methacrylate | 3.279 parts |
| Acrylic acid | 0.067 part |
| Azodiisobutyronitrile | 0.269 part |
| Copolymer stabiliser (33% solution, as described below) | 1.223 parts |

When a fine "seed" dispersion has formed by polymerisation of the above monomers, the following pre-mixed ingredients are fed, at a uniform rate over a period of 3 hours, into the hydrocarbon reflux stream:

| | |
|---|---|
| Methyl methacrylate | 23.961 parts |
| Glycidyl methacrylate | 0.334 part |
| Acrylic acid | 0.803 part |
| Hydroxyethyl acrylate | 6.693 parts |
| Azodiisobutyronitrile | 0.418 part |
| Copolymer stabiliser (33% solution, as described below) | 6.557 parts |
| Dimethylaminoethanol | 0.061 part |

The reaction mixture is held at reflux temperature (100° C.) for a further 2 hours, when complete conversion of monomer to polymer has taken place to give a fine dispersion of solids content 37–39%. The content of insoluble, crosslinked polymer gel is 23–24%.

The solution of copolymer stabiliser used in the above procedure is obtained as follows:

Stage I

The following mixture

| | |
|---|---|
| Toluene | 8.518 parts |
| 12-Hydroxystearic acid | 47.916 parts |
| Methanesulphonic acid | 0.096 part | is heated to reflux temperature and maintained there until the acid value has fallen to 33 mg. KOH/g.

There is then added:

| | |
|---|---|
| Glycidyl methacrylate | 5.164 parts |
| Dimethyl "coconut" amine | 0.192 part |
| p-tert-Butyl catechol | 0.048 part |
| Aliphatic hydrocarbon, b.p. 140°–165° C. | 2.129 parts | and the mixture is further heated under reflux until the acid value has fallen to less than 0.4 mg.KOH/g. The product is then diluted with more of the aliphatic hydrocarbon (35.937 parts).

Stage II

A mixture of

| | |
|---|---|
| Ethyl acetate and | 7.640 parts |
| Toluene | 7.640 parts | is heated to reflux temperature and to it is added at a steady rate over a period of 3 hours the following pre-mixed ingredients:

| | |
|---|---|
| Product of Stage I | 21.900 parts |
| Methyl methacrylate | 20.750 parts |
| Acrylic acid | 1.090 parts |
| Azodiisobutyronitrile | 0.620 part |

When the addition is complete, the mixture is held at reflux temperature for 2 hours. It is then diluted with aliphatic hydrocarbon, b.p. 100°–120° C. (40.360 parts).

B. PREPARATION OF ANIONIC SECOND POLYMER IN PRESENCE OF PARTICLES OF FIRST POLYMER

To a vessel fitted as described in (A) above is charged and heated to reflux temperature:

| | |
|---|---|
| Dispersion of First Polymer (as described in (A) above) | 78.939 parts |

The following pre-mixed ingredients are added at a constant rate over 3 hours, into the hydrocarbon reflux stream:

| | |
|---|---|
| Methyl methacrylate | 7.944 parts |
| Acrylic acid | 1.255 parts |
| Hydroxyethyl acrylate | 2.510 parts |
| Butyl acrylate | 5.019 parts |
| Copolymer stabiliser (33% solution, as described in (A) above) | 3.450 parts |
| Azodiisobutyronitrile | 0.221 part |
| Primary octyl mercaptan | 0.662 part |

The reaction mixture is held at reflux temperature for a further 4 hours to bring about full conversion of monomer to polymer, and the product is a stable dispersion of solids content 47–48%.

C. TRANSFER OF POLYMER PARTICLES TO AQUEOUS MEDIUM

To a vessel fitted as described in (A) above is charged:

| | |
|---|---|
| Distilled water | 53.305 parts |
| Butoxyethanol | 7.505 parts |
| Dimethylaminoethanol | 0.384 part |

This mixture is heated to 90° C., and there is then added slowly over a period of 1-2 hours:

| | |
|---|---|
| Dispersion from (B) above | 38.806 parts | at the same time removing distillate (23.881 parts) consisting of aliphatic hydrocarbon and water.

On cooling, the pH of the product is finally adjusted with further dimethylaminoethanol to a value of 7.8, giving a stable aqueous dispersion of polymer particles having a solids content of 24.2%.

EXAMPLE 2

A. PREPARATION OF PARTICLES OF FIRST POLYMER

To a vessel fitted with stirrer, thermometer and reflux condenser are added:

| | |
|---|---|
| Aliphatic hydrocarbon, b.p. 170°-210° C. | 11.053 parts |
| Aliphatic hydrocarbon, b.p. 90°-100° C. | 45.484 parts |

The mixture is heated to reflux temperature and the following pre-mixed ingredients are added:

| | |
|---|---|
| Methyl methacrylate | 3.291 parts |
| Azodiisobutyronitrile | 0.260 part |
| Copolymer stabiliser (33% solution, as described in Example 1) | 1.227 parts |

After formation of a "seed" polymer dispersion, the following previously mixed ingredients are added at a constant rate over 3 hours, into the hydrocarbon reflux stream:

| | |
|---|---|
| Methyl methacrylate | 20.837 parts |
| Hexane-1:6-diol dimethylacrylate | 3.376 parts |
| Hydroxyethyl acrylate | 6.717 parts |
| Dimethylaminoethyl methacrylate | 0.719 part |
| Copolymer stabiliser (33% solution, as described in Example 1) | 6.580 parts |
| Azodiisobutyronitrile | 0.426 part |

The reaction mixture is held at reflux temperature (100° C.) for a further 2 hours, until polymerisation is complete, to give a dispersion having a solids content of 38-39%, and an insoluble polymer gel content of 16.6%.

B. PREPARATION OF CATIONIC SECOND POLYMER IN PRESENCE OF PARTICLES OF FIRST POLYMER

To a vessel fitted as described in (A) above is charged and heated to reflux temperature:

| | |
|---|---|
| Dispersion of First Polymer (as described in Example 2(A) above) | 76.811 parts |

The following premixed ingredients are added at a constant rate over 3 hours, into the hydrocarbon reflux stream:

| | |
|---|---|
| Methyl methacrylate | 7.814 parts |
| Dimethylaminoethyl methacrylate | 4.156 parts |
| Hydroxyethyl acrylate | 2.442 parts |
| Butyl acrylate | 4.884 parts |
| Copolymer stabiliser (33% solution, as described in Example 1) | 3.357 parts |
| Azodiisobutyronitrile | 0.215 part |
| Primary octyl mercaptan | 0.322 part |

The reaction mixture is held at reflux temperature for a further 2 hours until polymerisation is complete, and the product is a stable dispersion of solids content of 45%.

C. TRANSFER OF POLYMER PARTICLES TO AQUEOUS MEDIUM

To a vessel fitted as described in (A) above is charged:

| | |
|---|---|
| Dispersion from Example 2(B) | 59.864 parts |
| Methyl ethyl ketone | 1.145 parts |
| Butoxyethanol | 7.373 parts |

The mixture is heated to 100°-120° C. and distillate (30.000 parts) is removed. On cooling to 100° C., there is added:

| | |
|---|---|
| Lactic acid | 1.732 parts |
| Distilled water | 29.886 parts | to give a stable dispersion having a pH of 5.5, with a total solids content of 40-42% and insoluble polymer gel content of 15%.

EXAMPLE 3

A. PREPARATION OF PARTICLES OF FIRST POLYMER

The procedure described in Example 2(A) is repeated.

B. PREPARATION OF NON-IONIC SECOND POLYMER IN PRESENCE OF PARTICLES OF FIRST POLYMER

To a vessel fitted with stirrer, thermometer and reflux condenser there are charged:

| | |
|---|---|
| Dispersion of First Polymer (as described in Example 2(A) above) | 55.497 parts |

-continued

| | |
|---|---|
| Hexane | 17.029 parts |

The mixture is raised to reflux temperature (84° C.) and the following pre-mixed ingredients are added over a period of 3 hours, into the hydrocarbon reflux stream:

| | |
|---|---|
| Vinyl pyrrolidone | 13.879 parts |
| Copolymer stabiliser (33% solution as described in Example 1) | 2.863 parts |
| Azodiisobutyronitrile | 0.549 part |
| Primary octyl mercaptan | 0.183 part |

The reaction mixture is heated under reflux for a further 2 hours, to give a stable dispersion having a total solids content of 45% and an insoluble polymer gel content of 19-20%.

C. TRANSFER OF POLYMER PARTICLES TO AQUEOUS MEDIUM

To a vessel fitted as described in (B) above there are added:

| | |
|---|---|
| Distilled water | 49.583 parts |
| Butoxyethanol | 3.967 parts |

The mixture is heated to 90°–97° C. and there is added slowly over 1 hour the following mixture:

| | |
|---|---|
| Dispersion from Example 3(B) | 43.435 parts | with the removal of distillate (39.0 parts). After addition of butoxyethanol (3.015 parts) to the residue, there was obtained a dispersion of solids content 32%.

I claim:

1. A method of preparing a stable dispersion in an aqueous medium or particles of polymer, the method comprising the steps of:
   (i) forming a stable dispersion of particles of a first polymer in a non-aqueous liquid in the presence of a steric stabiliser for the particles, the first polymer being insoluble in both the non-aqueous liquid and in water;
   (ii) polymerising in the same non-aqueous liquid, in the presence of the particles of the first polymer and of a steric stabiliser, one or more monomers capable of giving rise to a second polymer which is soluble in the chosen aqueous medium;
   (iii) transferring the resulting polymer particles from the non-aqueous medium to the said aqueous medium.

2. A method according to claim 1, in which the particles of the first polymer are produced by the polymerisation in the non-aqueous liquid, in the presence of the steric stabiliser, of one or more monomers which are soluble in that liquid but give rise to a polymer which is insoluble therein.

3. A method according to claim 1 or claim 2, in which the first polymer is an acrylic polymer derived principally from one or more monomers selected from lower alkyl esters or acrylic acid or methacrylic acid and vinyl esters of organic acids, and the non-aqueous liquid is an aliphatic hydrocarbon or an aliphatic/aromatic hydrocarbon mixture.

4. A method according to claim 1 or claim 2, in which the steric stabiliser employed in step (i) is a block of graft copolymer in which one polymer component is solvatable by the non-aqueous liquid and another polymeric component is not solvatable by that liquid and is capable of becoming associated with the disperse phase polymer.

5. A method according to claim 2, in which the steric stabiliser is produced by carrying out the polymerisation of the monomer or monomers in the presence, dissolved in the non-aqueous liquid, of a precursor compound containing in the molecule a polymer chain which is solvatable by that liquid and one or more groups which can copolymerise with, or undergo grafting by, the monomer or monomers.

6. A method according to claim 5, in which the first polymer consists essentially of poly(methyl methacrylate), the non-aqueous liquid is an aliphatic hydrocarbon and the precursor compound is poly(lauryl methacrylate).

7. A method according to claim 1 or claim 2, in which the first polymer consists essentially of poly(methyl methacrylate), the non-aqueous liquid is an aliphatic hydrocarbon and the steric stabiliser is a preformed copolymer obtained by reacting poly(12-hydroxystearic acid) with glycidyl methacrylate and then copolymerising the product with a mixture of methyl methacrylate and methacrylate acid or acrylic acid.

8. A method according to claim 1 or claim 2, in which the major monomer or monomers polymerised in step (ii) are selected from hydroxyalkyl esters of acrylic acid or methacrylic acid, monoacrylic or monomethacrylic esters of polyglycols, monovinyl ethers of polyglycols and vinylpyrrolidone.

9. A method according to claim 1 or claim 2, in which the monomers polymerised in step (ii) include an acrylic ester containing basic groups, the said groups being subsequently converted to salt groups by reacting with a suitable acid dissolved in the aqueous medium.

10. A method according to claim 1 or claim 2, in which the monomers polymerised in step (ii) include a polymerisable carboxylic acid and the aqueous medium contains a dissolved base.

11. A method according to claim 1 or claim 2, in which the stabilizer used in step (ii) is the same as that used in step (i).

* * * * *